United States Patent
Jung et al.

(10) Patent No.: US 8,954,236 B2
(45) Date of Patent: Feb. 10, 2015

(54) DEVICE COMBINING MOTOR DRIVEN POWER STEERING WITH COMPRESSOR, AND METHOD FOR CONTROLLING THE SAME

(75) Inventors: Dae Suk Jung, Seoul (KR); Un Koo Lee, Seoul (KR); Soo Bo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 13/492,238

(22) Filed: Jun. 8, 2012

(65) Prior Publication Data

US 2013/0030652 A1    Jan. 31, 2013

(30) Foreign Application Priority Data

Jul. 28, 2011  (KR) .................. 10-2011-0074838
Mar. 9, 2012  (KR) .................. 10-2012-0024170
Mar. 9, 2012  (KR) .................. 10-2012-0024172

(51) Int. Cl.
  *B62D 11/00*   (2006.01)
  *B62D 5/04*    (2006.01)
  *B60H 1/32*    (2006.01)

(52) U.S. Cl.
  CPC ............ *B62D 5/0478* (2013.01); *B62D 5/0424* (2013.01); *B62D 5/0463* (2013.01); *B60H 1/3211* (2013.01); *B60H 1/3222* (2013.01)
  USPC .................. 701/41; 701/22; 701/36; 701/42; 701/44; 701/99; 180/65.22

(58) Field of Classification Search
  None
  See application file for complete search history.

(56) References Cited

U.S. PATENT DOCUMENTS

| | | | | |
|---|---|---|---|---|
| 5,425,335 | A * | 6/1995 | Miyamoto et al. | 123/198 F |
| 6,048,288 | A * | 4/2000 | Tsujii et al. | 477/5 |
| 6,634,247 | B2 * | 10/2003 | Pels et al. | 74/329 |
| 6,887,180 | B2 * | 5/2005 | Pels et al. | 477/3 |
| 7,357,213 | B2 * | 4/2008 | Ji | 180/305 |
| 7,402,916 | B2 * | 7/2008 | Taspinar et al. | 290/22 |
| 7,472,769 | B2 * | 1/2009 | Yamanaka et al. | 180/65.25 |
| 8,216,113 | B2 * | 7/2012 | Parsons | 477/167 |
| 8,292,011 | B2 * | 10/2012 | Cimatti et al. | 180/65.22 |
| 8,406,954 | B2 * | 3/2013 | Whitney et al. | 701/36 |
| 8,454,463 | B2 * | 6/2013 | Parsons | 474/148 |
| 8,460,152 | B2 * | 6/2013 | Parsons et al. | 475/283 |

(Continued)

FOREIGN PATENT DOCUMENTS

| | | |
|---|---|---|
| JP | 9-182210 A | 7/1997 |
| JP | 2002-204501 A | 7/2002 |

(Continued)

*Primary Examiner* — Jonathan L Sample
(74) *Attorney, Agent, or Firm* — Morgan, Lewis & Bockius LLP

(57) ABSTRACT

A device combining motor driven power steering with a compressor, may include a deceleration gearbox connected to a steering shaft, a motor selectively providing a steering force to the deceleration gearbox, a first electronic clutch mounted between the deceleration gearbox and a first shaft of the motor, and transmitting or discontinuing transmission of power from the motor to the deceleration gearbox, a power transmitting gear set transmitting power from the motor to a compressor, a second electronic clutch mounted between a second shaft of the motor and an input side of the power transmitting gear set, and transmitting or discontinuing transmission of power from the motor to the power transmitting gear set, and the compressor for an air conditioner, connected to an output side of the power transmitting gear set.

7 Claims, 11 Drawing Sheets

(56) References Cited

U.S. PATENT DOCUMENTS

| | | |
|---|---|---|
| 8,474,556 B2 * | 7/2013 | Wang et al. ................ 180/65.22 |
| 8,485,929 B2 * | 7/2013 | Wust ................................. 475/5 |
| 2003/0103848 A1 * | 6/2003 | Hayashi ....................... 417/212 |
| 2006/0154763 A1 * | 7/2006 | Serkh ............................. 474/59 |
| 2008/0153638 A1 * | 6/2008 | Serkh ............................. 474/74 |
| 2008/0157528 A1 * | 7/2008 | Wang et al. .................... 290/43 |
| 2009/0255741 A1 * | 10/2009 | Major et al. .............. 180/65.22 |
| 2011/0190971 A1 * | 8/2011 | Severinsky et al. ............ 701/22 |
| 2012/0115668 A1 * | 5/2012 | Justin ........................... 475/219 |
| 2012/0266701 A1 * | 10/2012 | Yamada et al. .............. 74/15.82 |
| 2013/0074537 A1 * | 3/2013 | Rollinger et al. ........... 62/228.1 |

FOREIGN PATENT DOCUMENTS

| | | |
|---|---|---|
| KR | 2003-0017827 A | 3/2003 |
| KR | 10-2011-0062349 A | 6/2011 |

* cited by examiner

< MDPS OPERATING MODE >

< MDPS + AIR CONDITIONER OPERATING MODE >

< AIR CONDITIONER OPERATING MODE >

DEVICE COMBINING MOTOR DRIVEN POWER STEERING WITH COMPRESSOR, AND METHOD FOR CONTROLLING THE SAME

CROSS-REFERENCE TO RELATED APPLICATIONS

The present application claims priority to Korean Patent Application No. 10-2011-0074838 filed Jul. 28, 2011, 10-2012-0024170 filed Mar. 9, 2012 and 10-2012-0024172 filed Mar. 9, 2012, the entire contents of which is incorporated herein for all purposes by this reference.

FIELD OF THE INVENTION

The present invention relates to a device combining motor driven power steering with a compressor, and a method for controlling the same, and more particularly, to a device combining motor driven power steering with a compressor, which performs integration to combine the functions of a motor driven power steering device with a compressor for an air conditioner of a vehicle, in order to shorten the operation delay time when switching between each mode, and a method for controlling the same.

DESCRIPTION OF RELATED ART

As is widely known, a power steering device of a vehicle is used for reducing the steering force required to rotate a steering wheel, and power steering that employs hydraulic pressure has been used throughout the years.

The hydraulic power steering device is driven by hydraulic pressure supplied to an actuating cylinder from a hydraulic pump driven by an engine in order to actuate a steering wheel, and makes the steering wheel effort light at low speeds and heavier at high speeds for safe driving.

Motor driven power steering (MDPS) devices have been mounted in late model vehicles so as to vary steering effort according to vehicle speed.

More specifically, a motor driven steering device, as illustrated in FIG. 12, is a device for assisting steering power with torque from a motor, and is configured with a motor 14 for generating steering power, a rack drive-type deceleration gearbox 12 that connects an output shaft of the motor 14 to a steering shaft 10, and an ECU 32 that receives an input of the vehicle speed to control the driving of the motor, to thereby assist steering power.

Vehicles not only have a motor included in a motor driven power steering device thereof, but a motor included in a motor driven compressor for actuating an air conditioner thereof.

That is, as illustrated in FIG. 13, a motor driven compressor is a device that combines an inverter 34 with a motor 36 and a compressor 30, and is configured so that the compressor 30 is actuated by the driving of the motor 36 when the air conditioner is turned on.

Because the above described vehicle includes many motors, including one for the motor driven power steering device and another for the motor driven compressor, many problems arise such as an increase in the number of components and an increase in the number of assembly processes, an increase in manufacturing cost, and a reduction in installation space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device combining motor driven power steering with a compressor which allows for integration in order for the motor used in a motor driven power steering device of a vehicle to also be used as a motor for a motor driven compressor, so that the resulting combined motor functions may reduce the number of components and reduce the number of work processes.

The present invention has also been made in an effort to provide a method for controlling a device combining motor driven power steering with a compressor, which is capable of shortening the delay time for during switching between operating modes by simultaneously implementing motor deceleration control and clutch ON/OFF control, when switching between each operating mode of an integrated device for motor driven power steering and an air conditioner compressor in order to combine the operation of a motor driven power steering device and a motor driven compressor of a vehicle into one motor.

In a aspect of the present invention, a device combining motor driven power steering with a compressor, may include a deceleration gearbox connected to a steering shaft, a motor selectively providing a steering force to the deceleration gearbox, a first electronic clutch mounted between the deceleration gearbox and a first shaft of the motor, and transmitting or discontinuing transmission of power from the motor to the deceleration gearbox, a power transmitting gear set transmitting power from the motor to a compressor, a second electronic clutch mounted between a second shaft of the motor and an input side of the power transmitting gear set, and transmitting or discontinuing transmission of power from the motor to the power transmitting gear set, and the compressor for an air conditioner, connected to an output side of the power transmitting gear set.

The first electronic clutch and the second electronic clutch are elastically biased toward the motor.

The power transmitting gear set may include a drive gear selectively connected by the second electronic clutch to the second shaft of the motor, first and second one-way bearings simultaneously engaged to the drive gear, a power transmitting intermediate gear coaxially connected to the first one-way bearing, and an output gear having one side thereof coaxially connected to the second one-way bearing, and having the other side thereof connected to an input shaft of the compressor.

The power transmitting intermediate gear and the output gear are arranged in parallel and engaged to each other to transmit power.

The first one-way bearing transmits power to the power transmitting intermediate gear when the drive gear rotates in one rotation direction, and idles to discontinue transmission of power when the drive gear rotates in the other rotation direction.

The second one-way bearing transmits power to the output gear when the drive gear rotates in the other rotation direction, and idles to discontinue transmission of power when the drive gear rotates in one rotation direction.

In another aspect of the present invention, an operation controlling method of a device combining a motor driven power steering with a compressor, may include an MDPS mode operating step of transmitting rotational force from a single motor, for driving a motor driven power steering device and a motor driven compressor, to an MDPS gearbox when a first clutch is ON, and providing assist upon receipt of a driver steering input, an air conditioner mode operating step of transmitting the rotational force from the single motor to the compressor when a second clutch is ON, and performing compression of refrigerant, and an MDPS and air conditioner mode operating step of simultaneously connecting the rotational force from the motor to the MDPS gearbox and the compressor, and simultaneously operating the power steering device and the compressor, wherein a check is made of whether there is the driver steering input to a steering wheel, and when a switch is made from the air conditioner mode to the MDPS mode, the second clutch is turned OFF, and simultaneously, an ON point of the first clutch is varied according to a rotating direction of the motor to perform the MDPS mode.

When the switch is made from the air conditioner mode operating step to the MDPS mode operating step, when a current rotating direction of the motor is the same as a required rotating direction at a time when the second clutch is turned OFF, the motor is decelerated until a current motor speed and a required motor speed become the same, and when the current motor speed and the required motor speed become the same, current is applied to turn the first clutch ON.

When the switch is made from the air conditioner mode operating step to the MDPS mode operating step, when a current rotating direction of the motor is the opposite to a required rotating direction at a time when the second clutch is turned OFF, the motor is decelerated until a current motor speed becomes zero, and at a point when the current motor speed becomes zero, current is applied to turn the first clutch ON.

In further another aspect of the present invention, an operation controlling method of a device combining a motor driven power steering with a compressor, may include an MDPS mode operating step of transmitting rotational force from a single motor, for driving a motor driven power steering device and a motor driven compressor, to an MDPS gearbox when a first electromagnetic clutch is ON, and providing assist upon receipt of a driver steering input, an air conditioner mode operating step of transmitting the rotational force from the single motor to the compressor when a second electromagnetic clutch is ON, and performing compression of refrigerant, and an MDPS and air conditioner mode operating step of simultaneously connecting the rotational force from the motor to the MDPS gearbox and the compressor, and simultaneously operating the power steering device and the compressor, wherein when a switch is made from the MDPS mode operating step to the air conditioner mode operating step, after simultaneously turning the first electromagnetic clutch OFF and the second electromagnetic clutch ON, a motor rotating direction for driving an air conditioner is set the same as a current rotating direction of the motor according to a driver steering input direction prior to the air conditioner being turned ON, and the motor is accelerated.

When a switch is made from the MDPS mode operating step to the air conditioner mode operating step, after simultaneously turning the first electromagnetic clutch OFF and the second electromagnetic clutch ON, when a current rotating direction of the motor is in one rotation direction according to a right steering input to a steering wheel by a driver prior to the air conditioner being turned ON, a rotating direction of the motor is set in the one rotation direction, and the motor is accelerated to a rotating speed for driving the air conditioner.

When a switch is made from the MDPS mode operating step to the air conditioner mode operating step, after simultaneously turning the first electromagnetic clutch OFF and the second electromagnetic clutch ON, when a current rotating direction of the motor is in the other rotation direction according to a left steering input to a steering wheel by a driver prior to the air conditioner being turned ON, a rotating direction of the motor is set in the other rotation direction, and the motor is accelerated to a rotating speed for driving the air conditioner.

According to exemplary embodiments of the present invention, it is possible to use a motor used for an MDPS of a vehicle to drive a motor driven air conditioner compressor, so that the number of components may be reduced and thus, the manufacturing cost may be reduced, the number of assembly processes may be reduced, more space may be allotted for mounting components, and a package layout may be improved.

In particular, when considering that an MDPS motor requires bidirectional rotation and that a compressor requires only unidirectional rotation, by combining a power transmitting gear set between the motor and the compressor, the torque of the motor in both rotational directions may be harnessed for driving the compressor so as to enhance the efficiency of compressor operation.

According to exemplary embodiments of the present invention, it is also possible to use a motor used for an MDPS of a vehicle to drive a motor driven air conditioner compressor, and when switching between each operating mode (especially, when switching from an air conditioner operating mode to an MDPS mode), it is possible to implement a change in the deceleration control of the motor in accordance with a required rotating direction based on the current rotating direction of the motor and a driver steering input, and vary the ON point of a first clutch connected to an MDPS gearbox, in order to reduce a delay time when switching between operating modes, and thus improve MDPS responsiveness.

In addition, by using a motor used for an MDPS of a vehicle to drive a motor driven air conditioner compressor, and when switching between each operating mode (especially, when switching from an MDPS mode to an air conditioner operating mode), by setting the current rotating direction of the motor as the motor rotating direction for operating the air conditioner and accelerating the RPM level for operating the air conditioner, the delay time during the switching from an MDPS operating mode to an air conditioner operating mode may be reduced, and thus the responsiveness for switching from the MDPS operating mode to the air conditioner operating mode may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
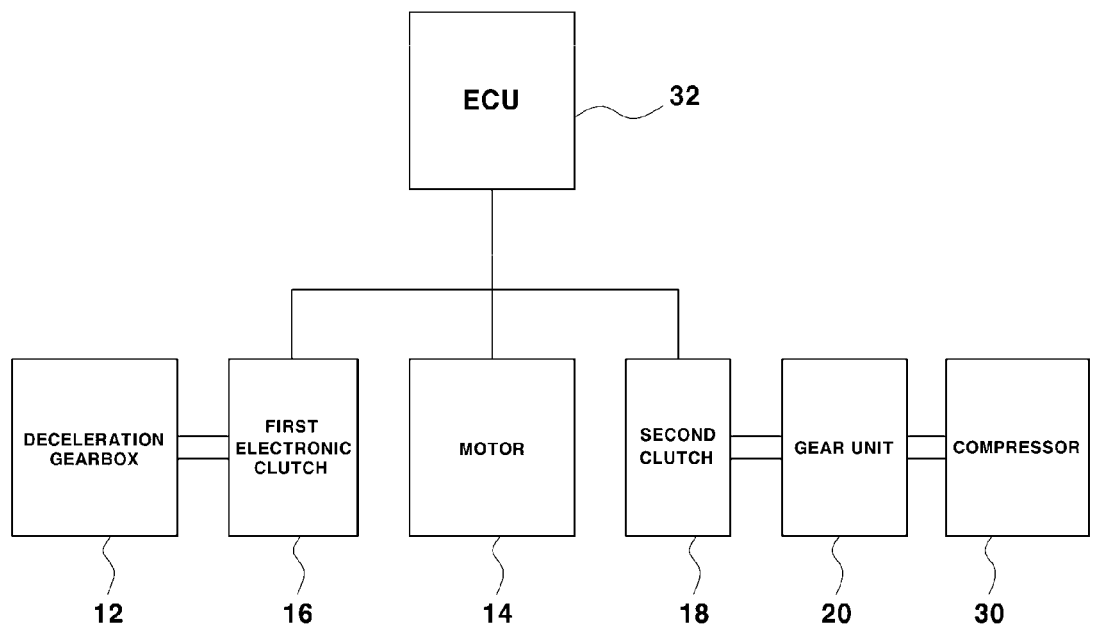
FIG. 1 is block diagram illustrating a device combining motor driven power steering with a compressor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

As described above, a motor driven power steering device is a device through which an ECU is capable of controlling the operation of a motor according to vehicle speed to provide optimum steering feel to a driver, and steering is performed by moving a rack-driving steering shaft to the left and right through the operation of the motor.

Figure 2:
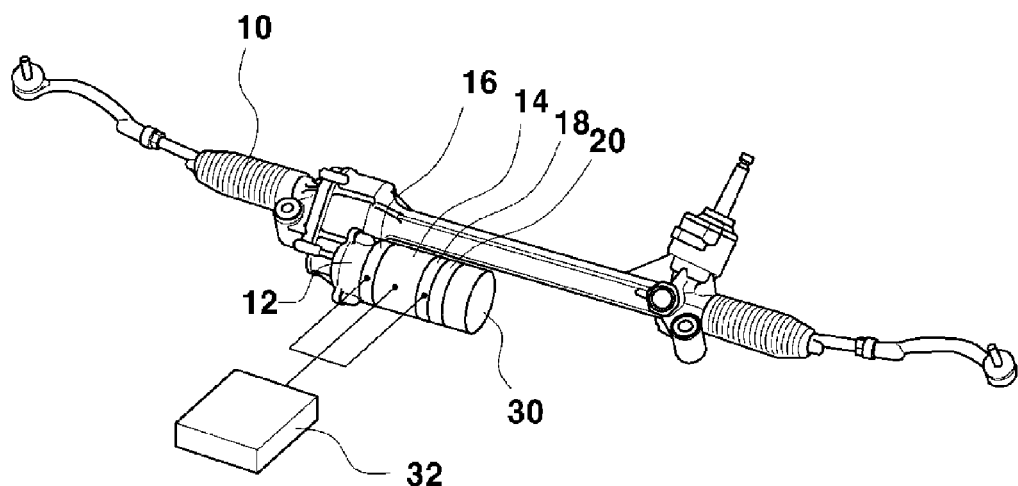
FIG. 2 is a perspective view illustrating a device combining motor driven power steering with a compressor according to an exemplary embodiment of the present invention.

Referring to FIG. 2, the output end of a deceleration gearbox 12 that performs deceleration and transmits power from a motor 14 to a steering shaft 10 is connected to the steering shaft 10, and the motor 14 is connected to the input end of the deceleration gearbox 12 to provide power for steering.

The motor 14 is a bidirectionally rotating motor, and adopts a configuration in which a first shaft and a second shaft protrude from both sides thereof.

Here, as illustrated in FIGS. 1 and 2, a typical first electronic clutch 16 is mounted between an input end of the deceleration gearbox 12 and a first shaft of the motor 14, and performs the function of transmitting or stopping the transmission of power from the motor 14 to the deceleration gearbox 12.

In further detail, with the first electronic clutch 16 connected to an input gear of the deceleration gearbox 12, the first electronic clutch 16 is moved and attached to the first shaft of the motor 14 when current is applied to the first electronic clutch 16 so that power is transmitted, and conversely, the first electronic clutch 16 is disconnected from the first shaft of the motor 14 by the restoring force of a return spring when the applied current is disconnected so that power transmission is discontinued.

Meanwhile, a power transmitting gear set 20 is connected to a second shaft 28 protruding from the opposite side of the motor 14 to transmit power from the motor 14 to a compressor 30.

Here, a second electronic clutch 18 is mounted between the second shaft 28 of the motor 14 and a drive gear 21 of the power transmitting gear set 20 to transmit power from the motor 14 to the power transmitting gear set 20 or discontinue the power transmission.

Specifically, with a shaft of the drive gear 21 connected to the second electronic clutch 18, when current is applied to the second electronic clutch 18, the second electronic clutch 18 moves toward the second shaft 28 of the motor 14 while the protruding second shaft 28 is inserted and coupled into a connecting slot 26 formed in the center of one side of the second electronic clutch 18, so that power from the motor 14 is transmitted to the drive gear 21, and conversely, when the applied current is disconnected, the second electronic clutch 18 is disconnected from the second shaft 28 of the motor 14 by the restoring force of the return spring so that the power transmission is discontinued.

Figure 3:
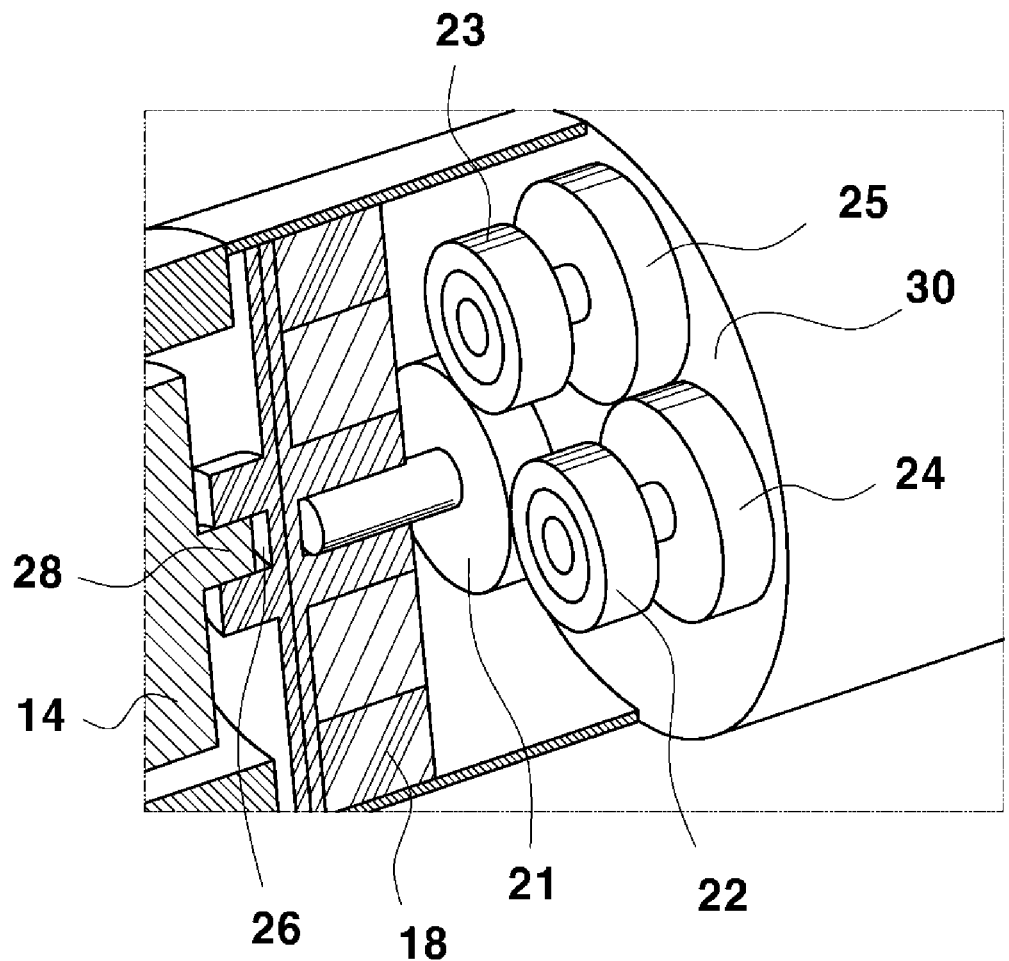
FIG. 3 is a perspective view illustrating a power transmitting gear set of a device combining motor driven power steering with a compressor according to an exemplary embodiment of the present invention.

Here, the structure of the power transmitting gear set, for connecting the motor and the compressor to enable the transmission of power, is as follows with reference to FIG. 3.

A center shaft of the drive gear 21, which is a component of the power transmitting gear set 20, is connected to the second electronic clutch 18, and first and second one-way bearings 22 and 23 are simultaneously engaged with the toothed surface of the drive gear 21.

Here, a power transmitting intermediate gear 24, connected by a hinge to a body of the compressor 30, is coaxially connected to the first one-way bearing 22, and an output gear 25, integrally connected to the input shaft of the compressor 30, is coaxially connected to the second one-way bearing 23.

The first and second one-way bearings 22 and 23 are configured as one-way clutch bearings that transmit power in only one direction, like a bearing on the rear wheel of a bicycle, and the first and second one-way bearings 22 and 23 transmit power when rotating in one pair of mutually opposite directions and discontinue the transmission of power when rotating in the other pair of mutually opposite directions.

Specifically, the first one-way bearing 22 transmits power to the power transmitting intermediate gear 24 when the drive gear 21 rotates counter clockwise, and idles to discontinue the power transmission when the drive gear 21 rotates clockwise. Also, the second one-way bearing 23 transmits power to the output gear 25 when the drive gear 21 rotates clockwise, and idles to discontinue the power transmission when the drive gear 21 rotates counter clockwise.

In this case, the power transmitting intermediate gear 24 and the output gear 25 are arrange parallel to each other with their respective toothed surfaces engaged so as to transmit power.

Hereinafter, the operating flow of a device combining motor driven power steering with a compressor configured as above according to an exemplary embodiment of the present invention will be described.

Figure 5:
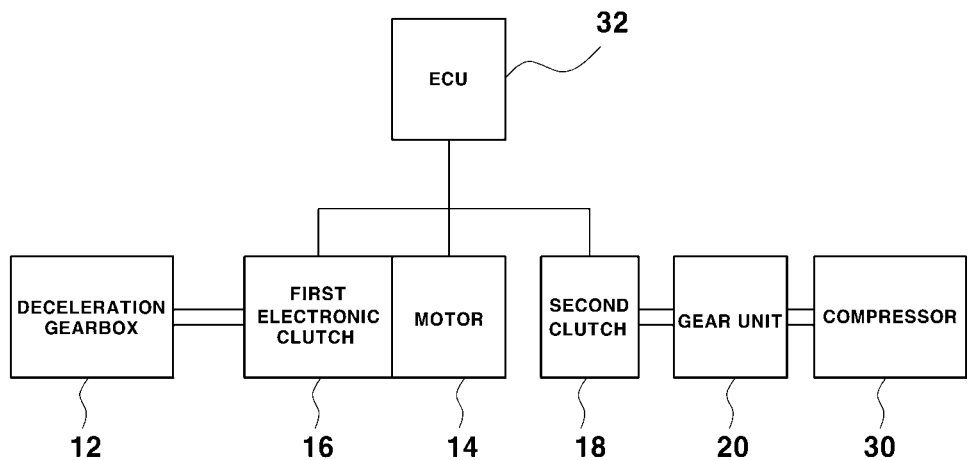
FIG. 5 is a schematic view illustrating operating modes of a device combining motor driven power steering with a compressor according to an exemplary embodiment of the present invention.
Figure 5:
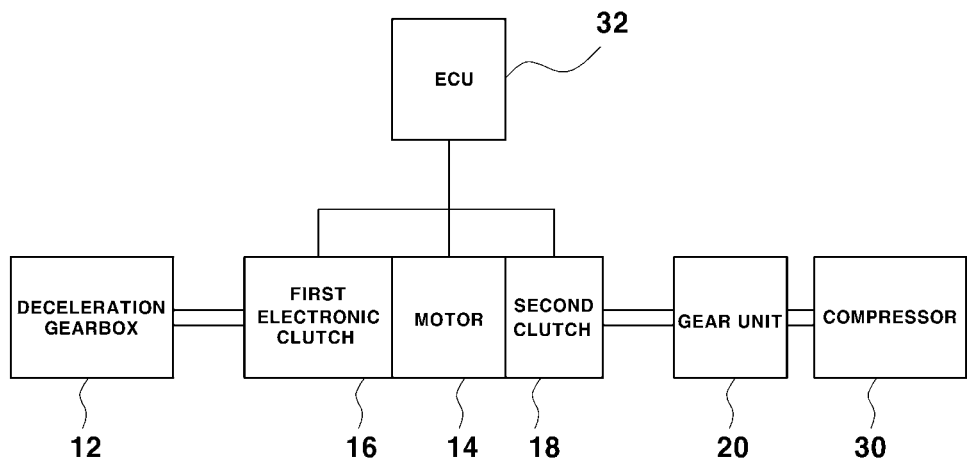
Figure 5:
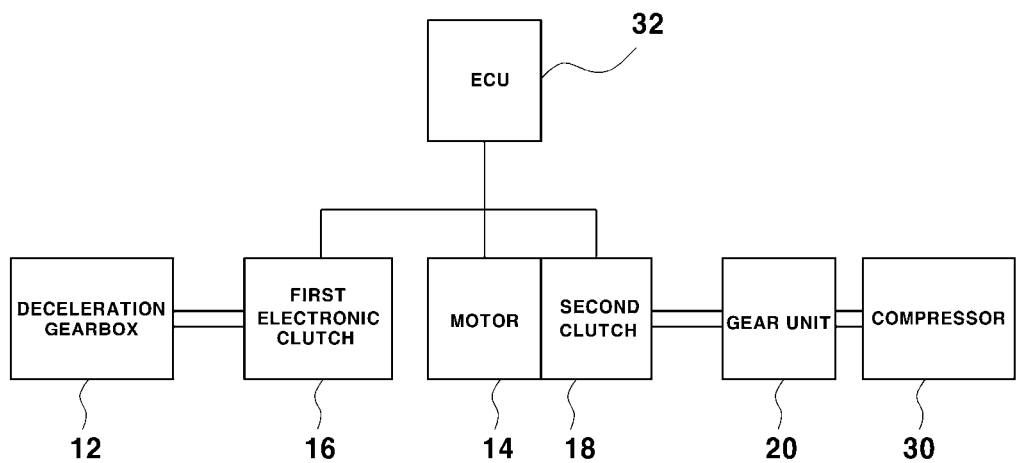

Referring to FIG. 5, operating modes of a device combining motor driven power steering with a compressor according to an exemplary embodiment of the present invention include an MDPS operating mode for steering while driving a vehicle, an air conditioner operating mode for only operating an air conditioner when the vehicle is stationary, and an MDPS+air conditioner operating mode for operating both the steering and the air conditioner.

The MDPS operating mode is a steering mode performed by a motor driven power steering device, in which current is applied to the first electronic clutch 16 so as to couple the first electronic clutch 16 to the first shaft of the motor 14, and in which current is not applied to the second electronic clutch 18 so that power from the motor 14 is not transmitted thereto.

Accordingly, the power from the motor 14 is transmitted through the first electronic clutch 16 to the deceleration gear box 12, while the steering shaft 10 receives output power from the deceleration gear box 12 so as to be operated, in order for steering to be performed by the motor 14.

The air conditioner operating mode is, for example, an operating mode in which an air conditioner is operated while the vehicle is stationary and steering is not being performed by the motor driven power steering device, where current is applied to the second electronic clutch 18 to couple the second electronic clutch 18 to the second shaft 28 of the motor 14, and where current is not applied to the first electronic clutch 16 so that power from the motor 14 is not transmitted to the deceleration gear box 12.

Therefore, the power from the motor 14 is transmitted through the second electronic clutch 18 to the power transmitting gear set 20, so that the compressor 30 is operated to operate the air conditioner.

The MDPS+air conditioner operating mode is a mode in which steering is performed together with the operation of the air conditioner, where the above MDPS operating mode and the operating mode of the air conditioner are simultaneously performed.

Figure 4A:
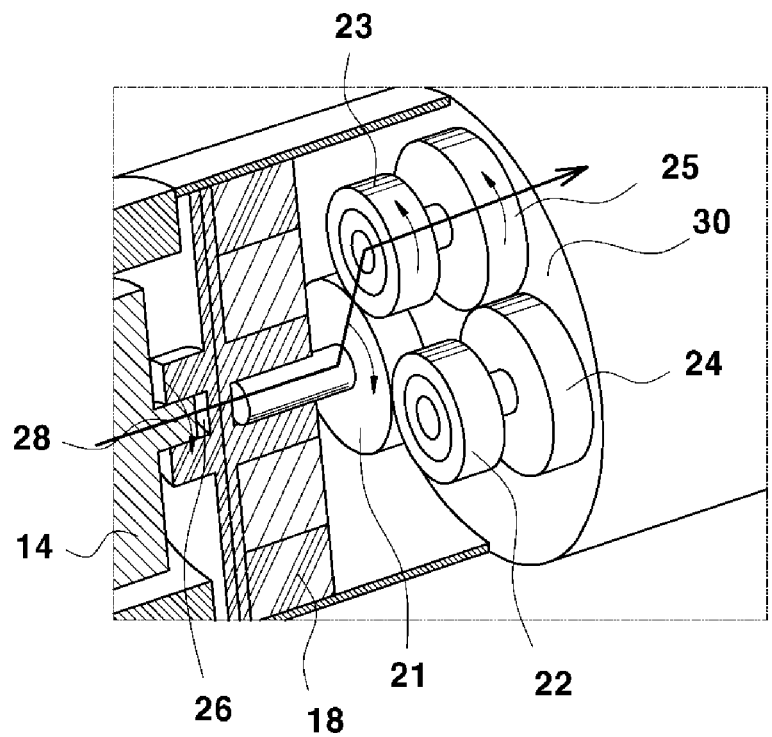
FIGS. 4A and 4B are operational diagrams of a power transmitting gear set of a device combining motor driven power steering with a compressor according to an exemplary embodiment of the present invention.
Figure 4B:
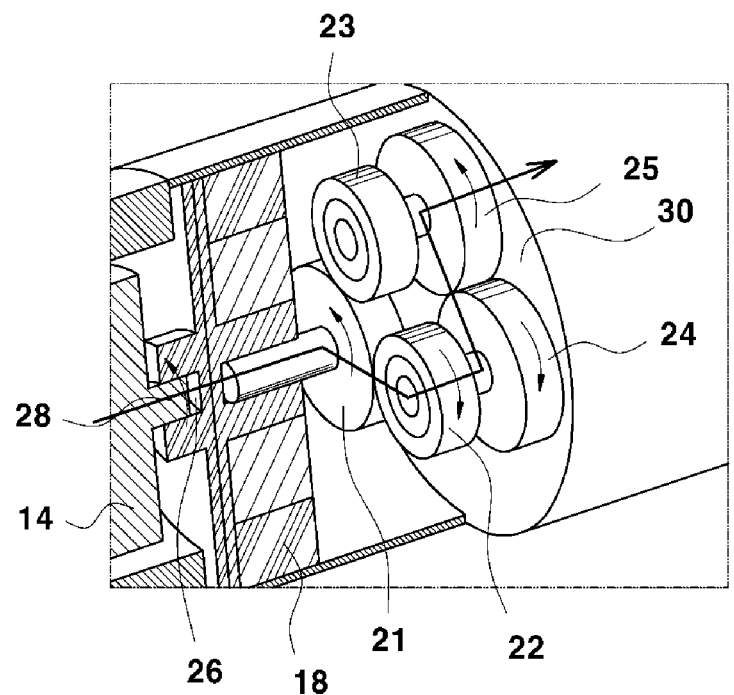

Hereinafter, the air conditioner operating mode and the process in which power is transmitted to the compressor in the air conditioner operating mode and the MDPS+air conditioner operating mode will be described in further detail with reference to FIGS. 4A and 4B.

First, when the motor 14 is operated in clockwise rotation, power is transmitted through the second electronic clutch 18 to the drive gear 21, and simultaneously, the drive gear 21 is rotated in the same clockwise direction as the motor 14.

Here, the first one-way bearing 22 that is coaxially connected to the power transmitting intermediate gear 24, from among the first and second one-way bearings 22 and 23 that are both engaged to the drive gear 21, idles and functions to disconnect power, and conversely, the second one-way bearing 23 rotates counter clockwise to transmit power from the drive gear 21 to the output gear 25.

Accordingly, the output gear 25 rotates counter clockwise to drive the compressor 30 and operate the air conditioner.

If the motor 14 is operated in counter clockwise rotation for steering, power is transmitted through the second electronic clutch 18 to the drive gear 21, and simultaneously, the drive gear 21 is also rotated in the same counter clockwise direction as the motor 14.

Here, the first one-way bearing 22 that is coaxially connected to the power transmitting intermediate gear 24, from among the first and second one-way bearings 22 and 23 that are both engaged to the drive gear 21, rotates clockwise to transmit power to the power transmitting intermediate gear 24, and conversely, the second one-way bearing 23 idles and functions to disconnect power to the output gear 25.

Accordingly, the power transmitting intermediate gear 24 rotates clockwise, while the output gear 25 engaged to the power transmitting intermediate gear 24 rotates counter clockwise to drive the compressor 30 and operate the air conditioner.

Hereinafter, an operation controlling method of a device combining motor driven power steering with a compressor according to one exemplary embodiment of the present invention will be described, based on the above configuration.

As illustrated in the FIGS. 1 and 2, the output end of the deceleration gearbox 12, which decelerates the rotational force of the motor 14 and transfers the power to the steering shaft 10, is connected to the steering shaft 10, the motor 14 that provides power for steering is connected to the input end of the deceleration gearbox 12, and the motor 14 is a motor that rotates bidirectionally and is formed with a first shaft and a second shaft protruding through either side thereof.

Here, a typical first electronic clutch 16 is mounted between the input end of the deceleration gearbox 12 and the first shaft of the motor 14, and functions to transmit or discontinue the transmission of power from the motor 14 to the deceleration gearbox 12.

In further detail, when current is applied to the first electronic clutch 16 with the first electronic clutch 16 connected to an input gear of the deceleration gearbox 12, the first electronic clutch 16 moves toward and is attached to the first shaft of the motor 14, so that power from the motor 14 is transmitted to an MDPS gearbox (namely, the deceleration gearbox 12) and an assist operation is performed for steering.

Conversely, when the applied current is discontinued, the first electronic clutch 16 is disconnected from the first shaft of the motor 14 through the restoring force of a return spring, and power transmission is discontinued.

A power transmitting planetary gear set 20 for transmitting power from the motor 14 to the compressor 30 is connected to the second shaft protruding from the opposite side of the motor 14, and the second electronic clutch 18, for transmitting or discontinuing the transmission of power from the motor 14 to the power transmitting gear set 20, is mounted between the second shaft of the motor 14 and a drive gear of the planetary gear set 20.

Accordingly, with the drive gear shaft of the power transmitting planetary gear set 20 connected to the second electronic clutch 18, when current is applied to the second electronic clutch 18, the second electronic clutch 18 is moved and coupled to the second shaft of the motor 14, so that power from the motor 14 is transmitted to the drive gear of the planetary gear set 20, and the compressor 30 is operated at high rpm.

Referring to FIG. 5, an MDPS operating mode for steering while a vehicle is being driven, an air conditioner operating mode in which only an air conditioner operates while the vehicle is stationary, and an MDPS+air conditioner operating mode in which both the steering and the air conditioner operation are performed, are included.

The MDPS operating mode is a steering mode performed by a motor driven power steering device, in which current is applied to the first electronic clutch 16 so as to couple the first electronic clutch 16 to the first shaft of the motor 14, and in which current is not applied to the second electronic clutch 18 so that power from the motor 14 is not transmitted thereto.

Accordingly, the power from the motor 14 is transmitted through the first electronic clutch 16 to the deceleration gear box 12, while the steering shaft 10 receives output power from the deceleration gear box 12 so as to be operated, in order for steering to be performed by the motor 14.

The air conditioner operating mode is, for example, an operating mode in which an air conditioner is operated while the vehicle is stationary and steering is not being performed by the motor driven power steering device, where current is applied to the second electronic clutch 18 to couple the second electronic clutch 18 to the second shaft of the motor 14, and where current is not applied to the first electronic clutch 16 so that power from the motor 14 is not transmitted to the deceleration gear box 12.

Therefore, the power from the motor 14 is transmitted through the second electronic clutch 18 to the power transmitting planetary gear set 20, so that the compressor 30 is operated to operate the air conditioner.

The MDPS+air conditioner operating mode is a mode in which steering with a small amount of steering torque is performed together with the operation of the air conditioner, where the MDPS operating mode and the air conditioner operating mode are simultaneously performed.

However, when the air conditioner mode is switched to the MDPS mode, there is the drawback that a mode switching delay time arises, due to the rpm difference between each mode (MDPS: up to 2,000 rpm versus A/C: up to 6,000 rpm), and the time required for the first electronic clutch 16 at the MDPS deceleration gearbox 12 side and the second electronic clutch 18 at the compressor 30 side to respectively be engaged and disengaged to and from the same motor 14.

In particular, when the air conditioner mode is operated on FULL and the motor rotates clockwise at 6,000 rpm, and a switch to MDPS mode is required when a driver steers in an opposite direction, the motor is required to rotate counter clockwise at 2,000 rpm. Here, because the process is required of decelerating the motor→second electronic clutch OFF at the compressor side→first electronic clutch ON at the MDPS side→re-accelerate motor (counter clockwise), etc., the drawback of the delay time arises when switching from air conditioner mode to MDPS mode.

To solve this drawback, an operation controlling method a device combining motor driven power steering with a compressor will hereinafter be described in detail.

Figure 6:
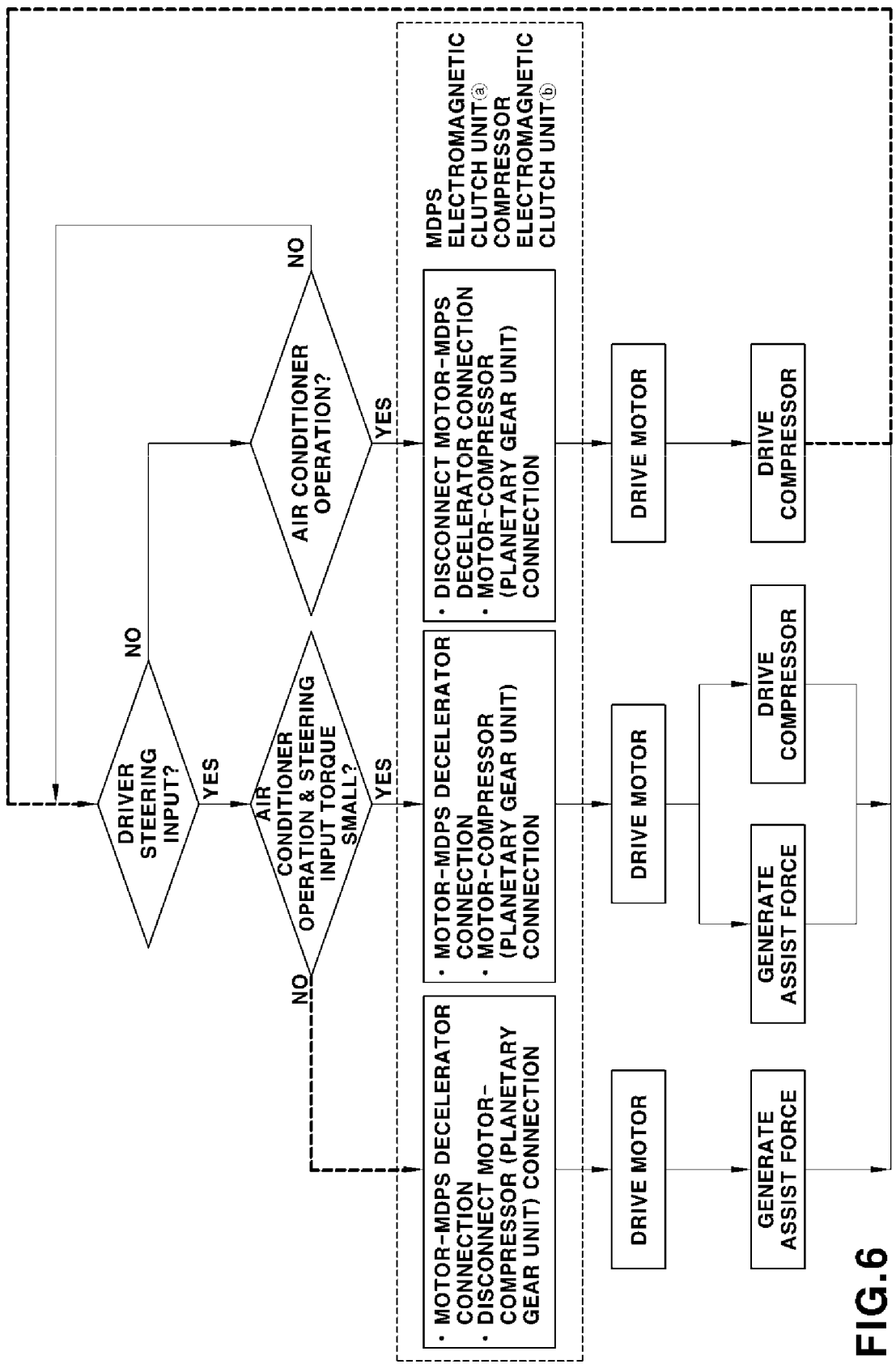
FIG. 6 is a flowchart illustrating an operation controlling method of a device combining motor driven power steering with a compressor according to one exemplary embodiment of the present invention.
Figure 7:
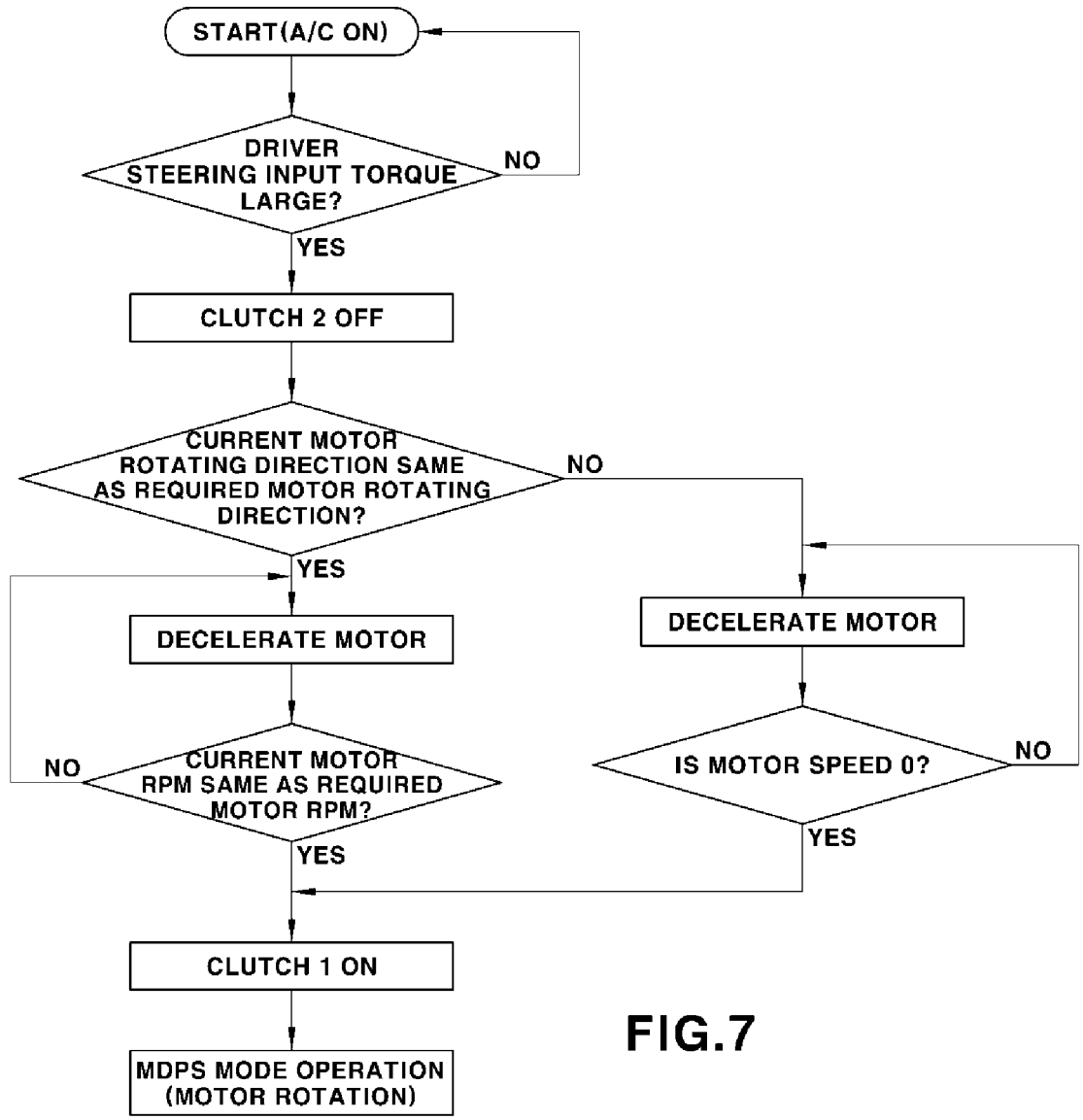
FIG. 7 is a flowchart illustrating in detail the operation controlling method of the device combining motor driven power steering with a compressor according to the one exemplary embodiment of the present invention.
Figure 8:
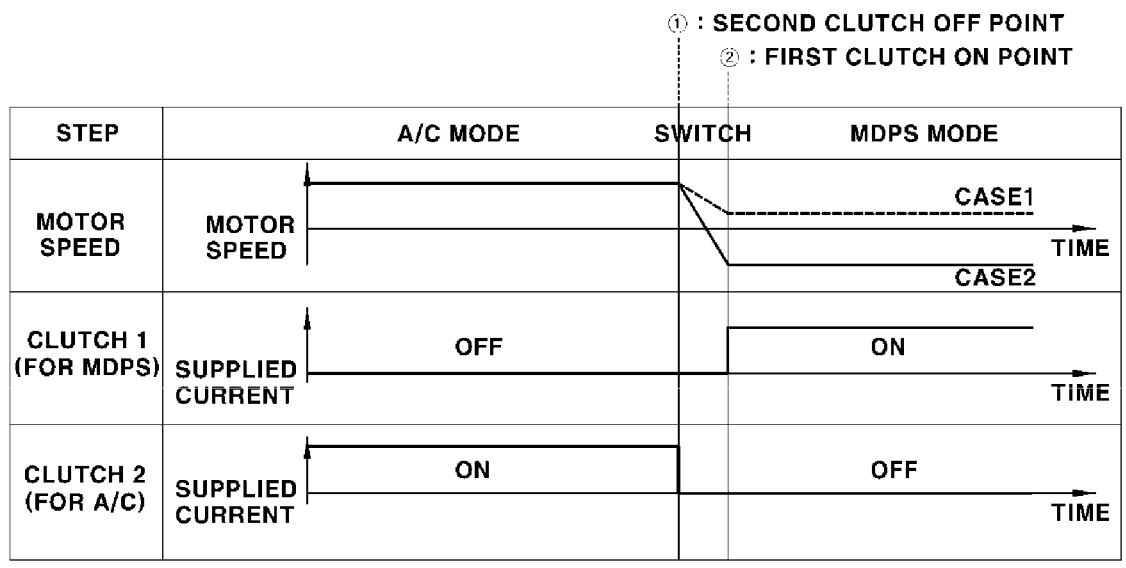
FIG. 8 is a waveform diagram illustrating mode switching times for the operation controlling method of the device combining motor driven power steering with a compressor according to the one exemplary embodiment of the present invention.

Referring to FIGS. 6 to 8, a method of operating a device combining motor driven power steering with a compressor includes: an MDPS mode operating step of transmitting rotational force from a single motor 14 to an MDPS gearbox 12 when a first clutch 16 is ON, and providing assist upon receipt of a driver steering input, an air conditioner mode operating step of transmitting the rotational force from the single motor 14 to a compressor 30 when a second clutch 18 is ON, and performing compression of refrigerant for cooling an interior, and an MDPS+air conditioner mode operating step of simultaneously connecting the rotational force from the motor 14 to the MDPS gearbox 12 and the compressor 30, and simultaneously operating the power steering device and the compressor.

According to the one exemplary embodiment of the present invention, when a switch is made from the air conditioner mode to the MDPS mode, deceleration control of a motor is varied according to a required rotating direction of the motor, depending on the current rotating direction of the motor and a steering input from a driver. Simultaneously, the ON point of a first clutch connected to an MDPS gearbox is varied, so that when an operating mode switch is made from the air conditioner mode to the MDPS mode, the delay time may be minimized, which is a main focus herein.

For this end, as illustrated by the thick solid lines in FIG. 6 and in the flowchart in FIG. 7, first, when a second electromagnetic clutch 18 is connected to the motor 14 and an air conditioner mode is implemented in which the compressor 30 operates due to the high speed rotation of the motor 14, the step of checking whether a driver steering input has been made is first implemented, and a torque sensor mounted at the steering wheel may be used to detect whether there has been a steering input to the steering wheel by a driver and the steering direction.

Next, when a steering input to the steering wheel is made by the driver, current to the second electromagnetic clutch 18 is discontinued to turn the second electromagnetic clutch 18 OFF, whereby the rotational power from the motor 14 is no longer transmitted to the compressor 30.

Then, if the current rotating direction of the motor 14 (for example, a clockwise direction in which the compressor was driven) and a required rotating direction (for example, a clockwise direction) of the motor 14 according to a steering wheel steering input direction (clockwise direction) are the same, the motor 14 is decelerated until the current motor speed and the required motor speed become the same.

For example, if the current motor speed is 6,000 rpm and the required motor speed is 2,000 rpm, the current motor speed is decelerated until it reaches the required motor speed of 2,000 rpm.

At the point when the current motor speed and the required motor speed become the same, current is supplied to turn a first electromagnetic clutch 16 ON, so that the power from the motor 14 is transmitted to the deceleration gearbox 12 to provide steering assist in the clockwise steering input direction desired by the driver.

Conversely, after the second electromagnetic clutch 18 is turned OFF, if the current rotating direction of the motor 14 (for example, a clockwise direction in which the compressor was driven) and a required rotating direction (for example, a counter clockwise direction) of the motor 14 according to a steering wheel steering input direction (counter clockwise) are the opposite, the motor 14 is decelerated until the current motor speed becomes zero.

At the point when the current motor speed becomes zero, current is supplied to turn the first electromagnetic clutch 16 on, so that the power from the motor 14 is transmitted to the deceleration gearbox 12 to provide steering assist in the counter clockwise steering input direction desired by the driver.

If the driver steering input torque is below a reference value, the first and second electromagnetic clutches 16 and 18 are simultaneously connected to the motor 14 to implement the MDPS+air conditioner operating mode, in which the MDPS operating mode and the air conditioner operating mode are simultaneously implemented.

Hereinafter, an operation controlling method of a device combining motor driven power steering with a compressor according to another exemplary embodiment of the present invention will be described, based on the above configuration.

As described above, an MDPS operating mode for steering while a vehicle is being driven, an air conditioner operating mode in which only an air conditioner operates while the vehicle is stationary, and an MDPS+air conditioner operating mode in which both the steering and the air conditioner operation are performed, are included.

The MDPS operating mode is a steering mode performed by a motor driven power steering device, in which current is applied to the first electromagnetic clutch 16 so as to couple the first electromagnetic clutch 16 to the first shaft of the motor 14, and in which current is not applied to the second electromagnetic clutch 18 so that power from the motor 14 is not transmitted thereto.

Accordingly, the power from the motor 14 is transmitted through the first electromagnetic clutch 16 to the deceleration gear box 12, while the steering shaft 10 receives output power from the deceleration gear box 12 so as to be operated, in order for steering to be performed by the motor 14.

The air conditioner operating mode is, for example, an operating mode in which an air conditioner is operated while the vehicle is stationary and steering is not being performed by the motor driven power steering device, where current is applied to the second electromagnetic clutch 18 to couple the second electromagnetic clutch 18 to the second shaft of the motor 14, and where current is not applied to the first electromagnetic clutch 16 so that power from the motor 14 is not transmitted to the deceleration gear box 12.

Therefore, the power from the motor 14 is transmitted through the second electromagnetic clutch 18 to the power transmitting planetary gear set 20, so that the compressor 30 is operated to operate the air conditioner.

The MDPS+air conditioner operating mode is a mode in which steering with a small amount of steering torque is performed together with the operation of the air conditioner, where the above MDPS operating mode and the air conditioner operating mode are simultaneously performed.

However, from among the operating modes, when the MDPS mode is switched to the air conditioner mode, there is the drawback that a mode switching delay time arises because controlling for setting the rotating direction of the motor is not performed.

For example, after the MDPS mode (where a driver inputs a right steering input to a steering wheel, motor rotating direction: CW) after operating, when an air conditioner ON (A/C ON) signal and the slight steering input to a steering wheel by a driver are detected, the time it takes for the current speed of the motor 14 to reach a point when it is zero, and the time it takes to re-accelerate the motor 14 counter clockwise (CCW) up to an rpm level for driving the air conditioner are expended until the air conditioner may be operated, and thus, a switch from MDPS mode to air conditioner mode involves the drawback of an extended delay time.

To solve this drawback, an operation controlling method of a device combining motor driven power steering with a compressor according to the other exemplary embodiment of the present invention will hereinafter be described in detail.

Figure 9:
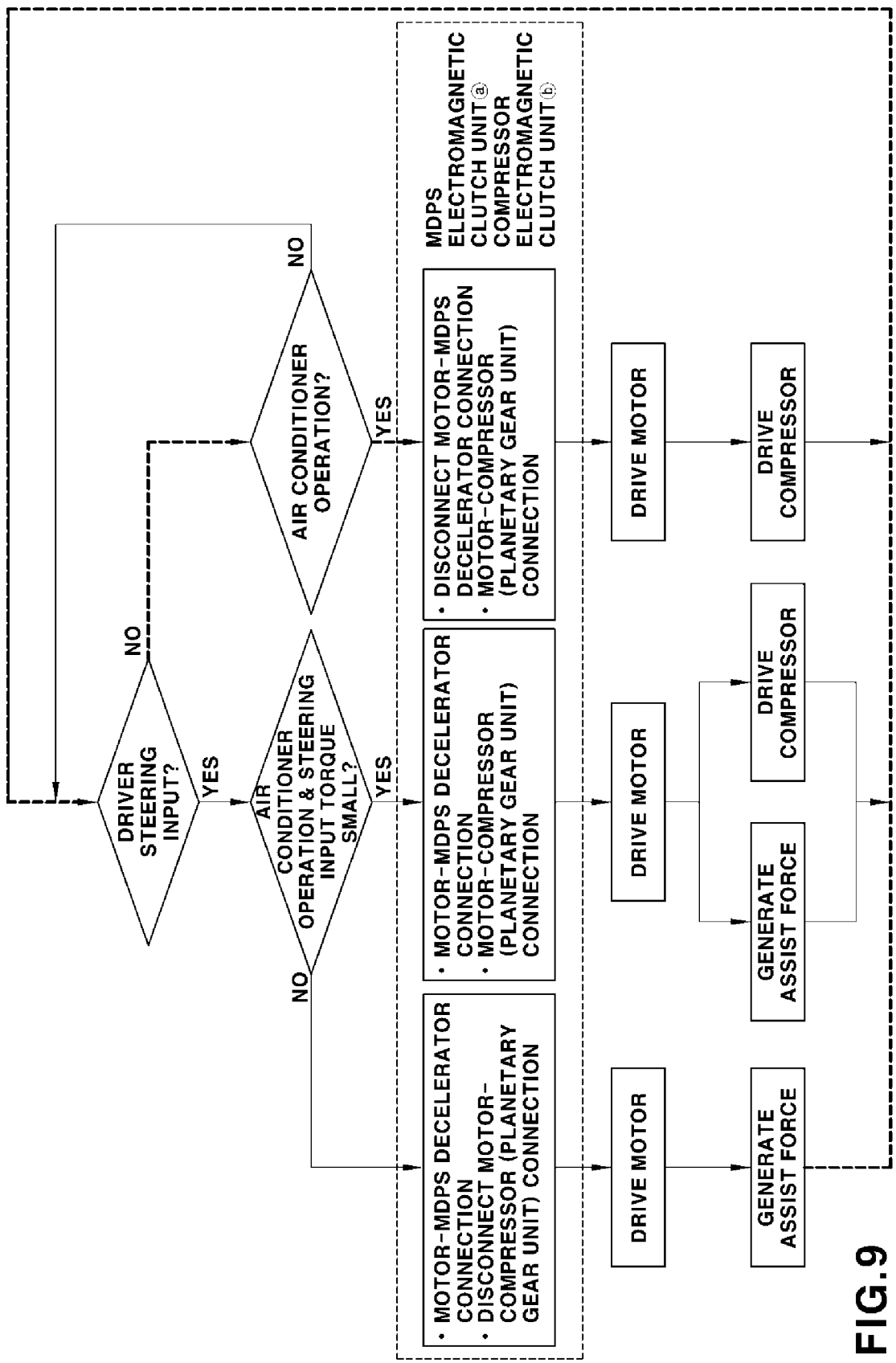
FIG. 9 is a flowchart illustrating an operation controlling method of a device combining motor driven power steering with a compressor according to another exemplary embodiment of the present invention.
Figure 10:
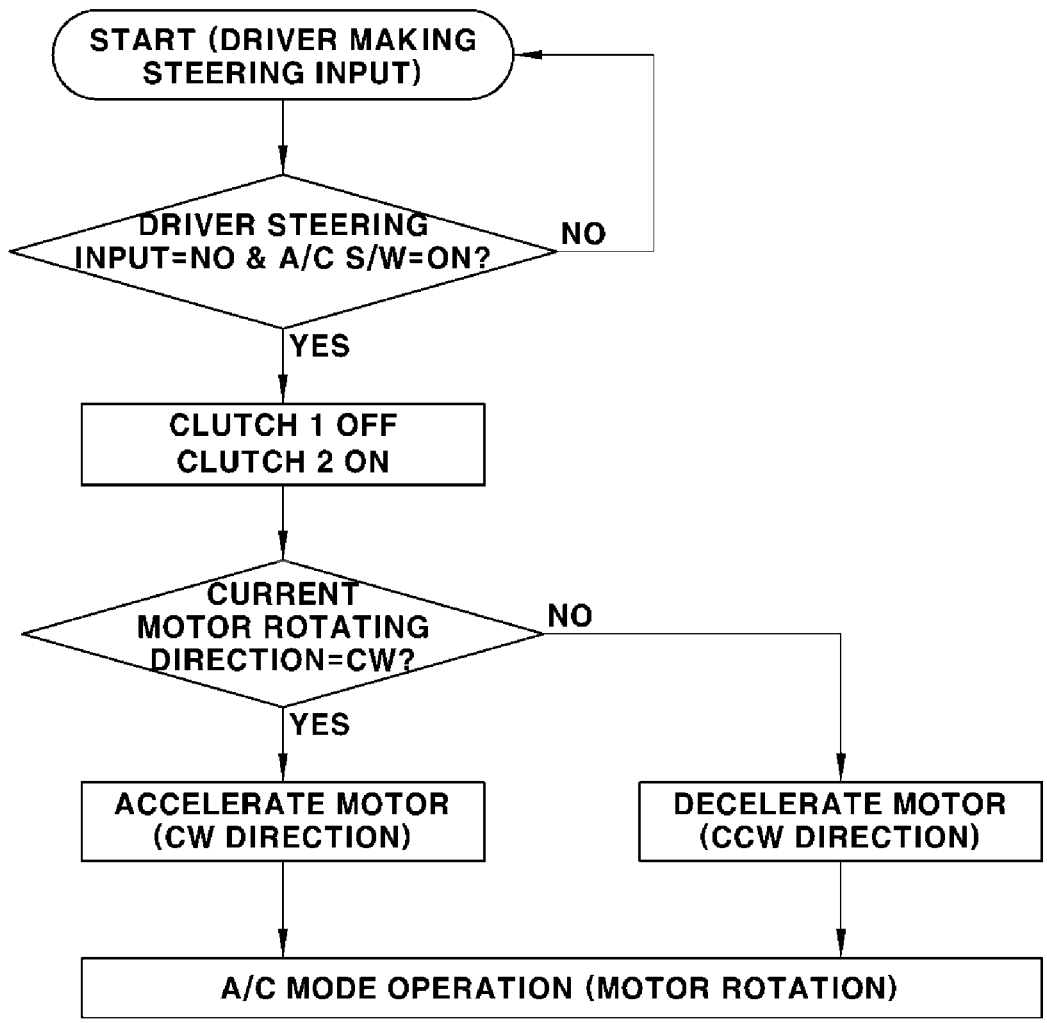
FIG. 10 is a flowchart illustrating in detail the operation controlling method of the device combining motor driven power steering with a compressor according to the other exemplary embodiment of the present invention.
Figure 11:
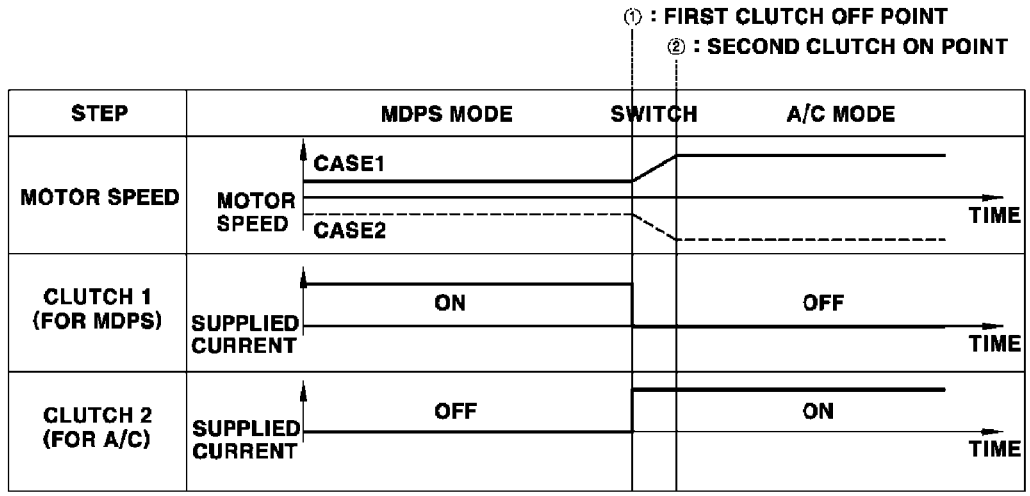
FIG. 11 is a waveform diagram illustrating mode switching times for the operation controlling method of the device combining motor driven power steering with a compressor according to the other exemplary embodiment of the present invention.
Figure 12:
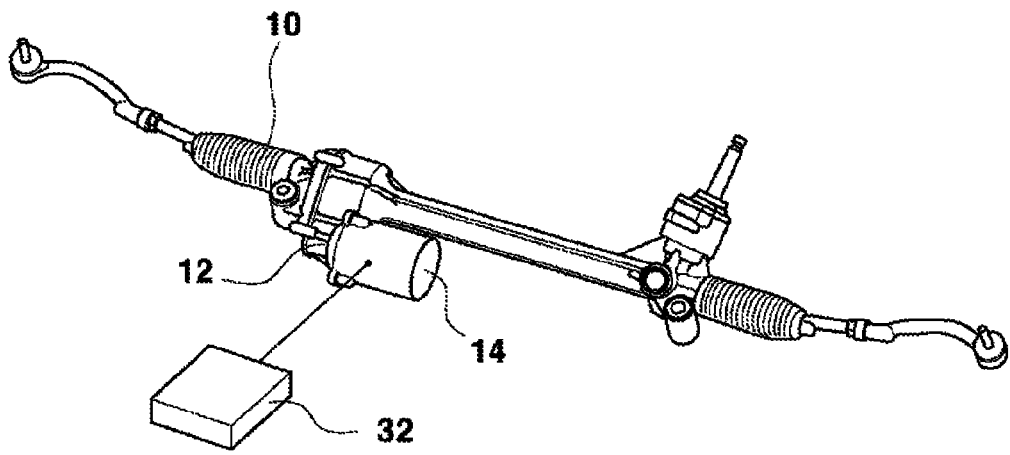
FIG. 12 is a schematic view illustrating a motor driven power steering structure according to the prior art.
Figure 13:
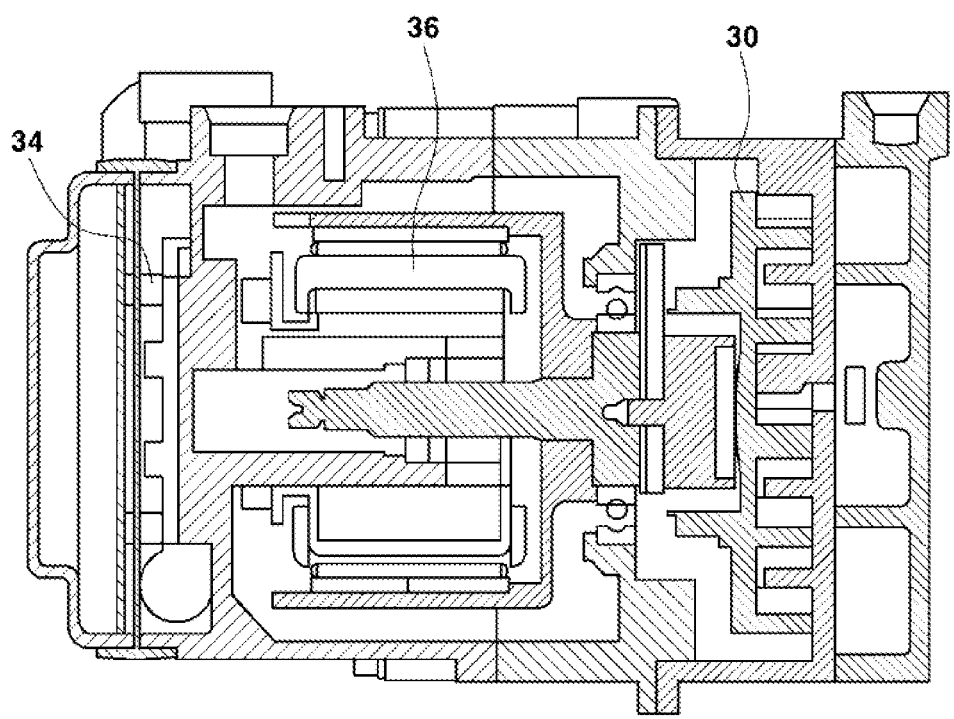
FIG. 13 is a schematic view illustrating a motor driven compressor structure according to the prior art.

Referring to FIGS. 9 to 11, an operation controlling method of a device combining motor driven power steering with a compressor, includes: an MDPS mode operating step of transmitting rotational force from a single motor 14 to an MDPS gearbox 12 when a first electromagnetic clutch 16 is ON, and providing assist upon receipt of a driver steering input, an air conditioner mode operating step of transmitting the rotational force from the single motor 14 to a compressor 30 when a second electromagnetic clutch 18 is ON, and performing compression of refrigerant for cooling an interior, and an MDPS+air conditioner mode operating step of simultaneously connecting the rotational force from the motor 14 to the MDPS gearbox 12 and the compressor 30, and simultaneously operating the power steering device and the compressor.

According to the other exemplary embodiment of the present invention, when a switch is made from the MDPS mode to the air conditioner mode, after simultaneously turning the first electromagnetic clutch 16 OFF and the second electromagnetic clutch 18 ON, a motor rotating direction for driving the air conditioner is set the same as a current rotating direction of the motor 14 according to a driver steering input direction prior to the air conditioner being turned ON, and the motor 14 is accelerated, so as to minimize the delay time when switching from MDPS mode to air conditioner operating mode, which is the main point herein.

As illustrated by the thick solid line portion in FIG. 9, the MDPS mode is implemented when a driver steering input has been made to a steering wheel, and at the same time that a driver steering input to the steering wheel is not detected, the air conditioner is switched ON to switch to air conditioner operating mode.

Here, a torque sensor mounted at the steering wheel may detect whether there has been a steering input to the steering wheel by a driver and the steering direction.

Next, at the time when a steering input to the steering wheel by the driver is not detected, if the air conditioner is switched ON, current is discontinued to turn the first electromagnetic clutch 16 OFF, and the rotational force from the motor 14 is no longer transmitted to the MDPS deceleration gearbox 12.

Then, after the first electromagnetic clutch 16 is turned OFF and the second electromagnetic clutch 18 is simultaneously turned ON, a motor rotating direction for driving the air conditioner is set the same as a current rotating direction of the motor according to a driver steering input direction prior to the air conditioner being turned ON, and the motor is accelerated at the same time up to an rpm for operating the air conditioner.

According to the an exemplary embodiment of the present invention, when a switch is made from the MDPS mode to the air conditioner mode, after simultaneously turning the first electromagnetic clutch 16 OFF and the second electromagnetic clutch 18 ON, if the current rotating direction of the motor 14 according to a right driver steering input direction of the steering wheel prior to the air conditioner being turned ON is a clockwise direction, the rotating direction of the motor 14 is set clockwise and simultaneously, the motor 14 is accelerated until it reaches an rpm for operating the air conditioner.

Also, according to the another exemplary embodiment of the present invention, when switching from the MDPS mode to the air conditioner operating mode as described above, after the first electromagnetic clutch 16 is turned OFF and the second electromagnetic clutch 18 is simultaneously turned ON, if the current rotating direction of the motor 14 according to a left driver steering input direction of the steering wheel prior to the air conditioner being turned ON is a counter clockwise direction, the rotating direction of the motor 14 is set counter clockwise, and the motor 14 is accelerated until it reaches an rpm for operating the air conditioner.

Thus, when switching from an MDPS mode to an air conditioner operating mode, without a process of decelerating the motor 14, the rotating direction of the motor 14 may be maintained the same in the MDPS mode even when the air conditioner is operating, and only the rpm may be accelerated to a level at which the air conditioner operates, in order to reduce a delay time when switching from the MDPS operating mode to the air conditioner operating mode.

Similarly, if the driver steering input torque is below a reference value, the first and second electromagnetic clutches 16 and 18 are simultaneously connected to the motor 14 to implement the MDPS+air conditioner operating mode, in which the MDPS operating mode and the air conditioner operating mode are simultaneously implemented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device combining motor driven power steering with a compressor, comprising:
    a deceleration gearbox connected to a steering shaft;
    a motor selectively providing a steering force to the deceleration gearbox;
    a first electronic clutch mounted between the deceleration gearbox and a first shaft of the motor, and transmitting or discontinuing transmission of power from the motor to the deceleration gearbox;
    a power transmitting gear set transmitting power from the motor to a compressor;
    a second electronic clutch mounted between a second shaft of the motor and an input side of the power transmitting gear set, and transmitting or discontinuing transmission of power from the motor to the power transmitting gear set; and
    the compressor for an air conditioner, connected to an output side of the power transmitting gear set, wherein the power transmitting gear set includes
        a drive gear selectively connected by the second electronic clutch to the second shaft of the motor;
        first and second one-way bearings simultaneously engaged to the drive gear;
        a power transmitting intermediate gear coaxially connected to the first one-way bearing;
        an output gear having one side thereof coaxially connected to the second one-way bearing, and having the other side thereof connected to an input shaft of the compressor.

2. The device combining motor driven power steering with the compressor of claim 1, wherein the first electronic clutch and the second electronic clutch are elastically biased toward the motor.

3. The device combining motor driven power steering with the compressor of claim 1, wherein the power transmitting intermediate gear and the output gear are arranged in parallel and engaged to each other to transmit power.

4. The device combining motor driven power steering with the compressor of claim 1, wherein the first one-way bearing transmits power to the power transmitting intermediate gear when the drive gear rotates in one rotation direction, and idles to discontinue transmission of power when the drive gear rotates in the other rotation direction.

5. The device combining motor driven power steering with the compressor of claim 1, wherein the second one-way bearing idles to discontinue transmission of power when the drive gear rotates in one rotation direction and transmits power to the output gear when the drive gear rotates in the other rotation direction.

6. An operation controlling method of a device combining a motor driven power steering with a compressor, comprising:
    an MDPS mode operating step of transmitting rotational force from a single motor, for driving a motor driven power steering device and a motor driven compressor, to an MDPS gearbox when a first clutch is ON, and providing assist upon receipt of a driver steering input;
    an air conditioner mode operating step of transmitting the rotational force from the single motor to the compressor when a second clutch is ON, and performing compression of refrigerant; and
    an MDPS and air conditioner mode operating step of simultaneously connecting the rotational force from the motor to the MDPS gearbox and the compressor, and simultaneously operating the power steering device and the compressor,
    wherein a check is made of whether there is the driver steering input to a steering wheel, and when a switch is made from the air conditioner mode to the MDPS mode, the second clutch is turned OFF, wherein when a current rotating direction of the motor is the same as a required rotating direction at a time when the second clutch is turned OFF, the motor is decelerated until a current motor speed and a required motor speed become the same and simultaneously, current is applied to turn the first clutch ON to perform the MDPS mode, or when a current rotating direction of the motor is the opposite to a required rotating direction at a time when the second clutch is turned OFF, the motor is decelerated until a current motor speed becomes zero, and simultaneously, current is applied to turn the first clutch ON to perform the MDPS mode.

7. An operation controlling method of a device combining a motor driven power steering with a compressor, comprising:
    an MDPS mode operating step of transmitting rotational force from a single motor, for driving a motor driven power steering device and a motor driven compressor, to an MDPS gearbox when a first electromagnetic clutch is ON, and providing assist upon receipt of a driver steering input;
    an air conditioner mode operating step of transmitting the rotational force from the single motor to the compressor when a second electromagnetic clutch is ON, and performing compression of refrigerant; and
    an MDPS and air conditioner mode operating step of simultaneously connecting the rotational force from the motor to the MDPS gearbox and the compressor, and simultaneously operating the power steering device and the compressor,
    wherein when a switch is made from the MDPS mode operating step to the air conditioner mode operating step, after simultaneously turning the first electromagnetic clutch OFF and the second electromagnetic clutch ON, wherein when a current rotating direction of the motor is in one rotation direction according to a right steering input to a steering wheel by a driver prior to the air conditioner being turned ON, a rotating direction of the motor is set in the one rotation direction, and the motor is accelerated to a rotating speed for driving the air conditioner being turned ON, a rotating direction of the motor is set in the one rotation direction, and the motor is accelerated to a rotating speed for driving the air conditioner, or when a current rotating direction of the motor is in the other rotation direction according to a left steering input to a steering wheel by a driver prior to the air conditioner being turned ON, a rotating direction of the motor is set in the other rotation direction, and the motor is accelerated to a rotating speed for driving the air conditioner.

* * * * *